UNITED STATES PATENT OFFICE.

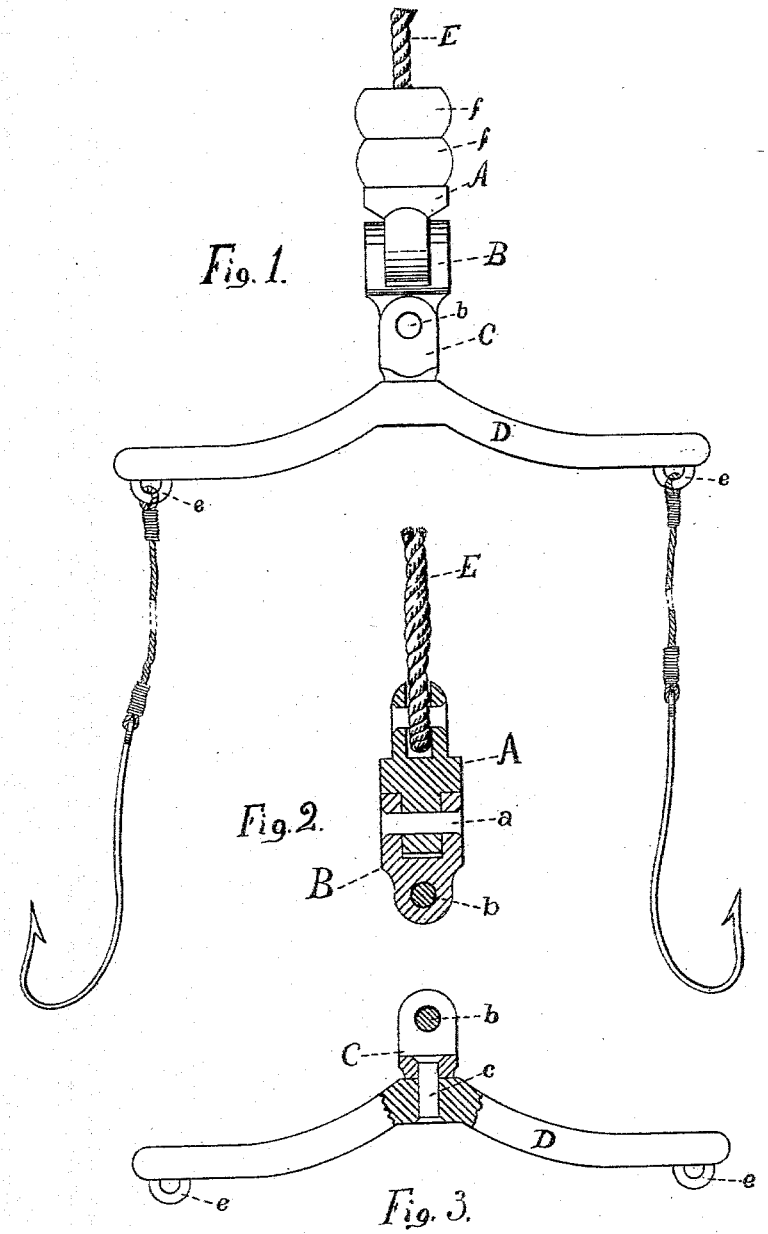

EMERY A. RAMSDELL, OF LYNN, MASSACHUSETTS, ASSIGNOR TO WALTER L. NEWHALL, OF SAME PLACE.

DEEP-SEA-FISHING DEVICE.

SPECIFICATION forming part of Letters Patent No. 356,789, dated February 1, 1887.

Application filed January 28, 1886. Serial No. 190,064. (No model.)

*To all whom it may concern:*

Be it known that I, EMERY A. RAMSDELL, a citizen of the United States, residing at Lynn, in the county of Essex and State of Massachusetts, have invented a new and useful Deep-Sea-Fishing Device, of which the following is a specification.

In deep-sea fishing it is necessary to use heavy sinkers on the line, and it is customary to use two short lines of different lengths attached to a cross-piece on the lower end of the main line. The sinkers commonly used occasion great trouble and annoyance by frequently chafing off the line, and the short lines attached to the cross-piece frequently foul and become entangled.

The object of my invention is to obviate these difficulties, which result I attain by the mechanism illustrated in the accompanying drawings, in which—

Figure 1 is a front elevation of the entire device; Fig. 2, a sectional view of the upper and middle portion of the device; and Fig. 3, a view of the cross piece, with the center of it in section, showing the manner in which it is attached to the piece above.

Similar letters refer to similar parts throughout the several views.

The device consists of three metallic pieces, A B C, jointed together, and the cross-piece D, riveted to the lower of said jointed pieces. The upper of these pieces, A, is provided with a shank on its upper portion, through which the line E passes, and to which it is attached. This piece A is jointed to the next lower piece, B, and made to turn on the pin $a$. The piece B is provided with two ears. The lower part of the piece A is made to fit loosely between them, and the pin $a$ is passed through both, and is kept in place by spreading it at the ends in an obvious and well-known manner. The piece B is jointed to the next lower piece, C, in the same manner, but so that the joint they make will be at right angles with the joint above—that is, so that the pieces A and B may turn on the pin $a$ in one direction, and the pieces B and C turn on the pin $b$ in another direction. The object of having the joints at right angles is, that they may not kink or break when they come in contact with rock at the bottom of the sea.

The cross-piece D is riveted to the piece C by the rivet $c$. It is made to swivel on the rivet, so that the short lines attached to the eyes $e$ $e$ on the ends of the cross-piece may not foul. The sinkers used in connection with this device should be strung like beads on the line E. Any number desired may be placed on the line. Those shown in the drawings, $f$ $f$, are cylindrical in form; but they may be made spherical or in any desired form. The lower one on the line should be made with a hole large enough to slip over the shank on the piece A, so that it may come down to the shoulder on said piece, as shown in Fig. 1.

The cross-piece D may be attached to the piece C by a screw instead of a rivet, if desired.

The device is operated as follows: Two short lines of different lengths, each provided with a hook, are attached to the eyes $e$ $e$ on the ends of the cross-piece D, and the whole device, which is attached to the line E, is lowered into the water.

Having fully described my invention, what I claim, and desire to secure by Letters Patent, is—

A deep-sea-fishing device having the metallic pieces A B C jointed together with the joints at right angles, as shown, and the lower piece, C, having swivel-connection with the cross-piece D, all substantially as described.

EMERY A. RAMSDELL.

Witnesses:
W. B. HUTCHINSON,
W. F. HUTCHINSON.